United States Patent
McLean et al.

(10) Patent No.: US 9,569,762 B2
(45) Date of Patent: Feb. 14, 2017

(54) REPLENISHING FUEL CELL POWERED PORTABLE DEVICES

(75) Inventors: Gerard F. McLean, West Vancouver (CA); Olen Richard Vanderleeden, Coquitlam (CA); Anna Stukas, Vancouver (CA); Denis J. Connor, West Vancouver (CA)

(73) Assignee: Intelligent Energy Limited, Loughborough (GB)

( * ) Notice: Subject to any disclaimer, the term of this patent is extended or adjusted under 35 U.S.C. 154(b) by 678 days.

(21) Appl. No.: 12/067,644

(22) PCT Filed: Sep. 25, 2006

(86) PCT No.: PCT/CA2006/001577
§ 371 (c)(1),
(2), (4) Date: Sep. 19, 2008

(87) PCT Pub. No.: WO2007/033494
PCT Pub. Date: Mar. 29, 2007

(65) Prior Publication Data
US 2009/0092864 A1    Apr. 9, 2009

Related U.S. Application Data

(63) Continuation of application No. 11/232,912, filed on Sep. 23, 2005, now abandoned.

(51) Int. Cl.
*H01M 8/04* (2016.01)
*G06Q 20/18* (2012.01)
(Continued)

(52) U.S. Cl.
CPC .............. *G06Q 20/18* (2013.01); *G06Q 20/20* (2013.01); *G06Q 30/0283* (2013.01);
(Continued)

(58) Field of Classification Search
None
See application file for complete search history.

(56) References Cited

U.S. PATENT DOCUMENTS 5,631,536 A * 5/1997 Tseng .......................... 320/137
5,641,585 A * 6/1997 Lessing et al. ................ 429/26
(Continued)

FOREIGN PATENT DOCUMENTS

CN    1234913 A    11/1999
CN    1524312 A    8/2004
(Continued)

OTHER PUBLICATIONS

"Convenience U Offers Convenience Store Retailers Strategies on How to Win Big With Lottery Sales", News Release transmitted by CNNMatthews, (Feb. 14, 2005), [online]. [retrieved on Jan. 9, 2007]. Retrieved from the Internet: <URL:http://www2.ccnmatthews.com/scripts/ccn-release.pl?/2005/ 02/14/0214110n.html>, 2 pgs.
(Continued)

*Primary Examiner* — Fateh M Obaid
(74) *Attorney, Agent, or Firm* — Baker & Hostetler LLP

(57) ABSTRACT

Portable electronic devices such as portable telephones, portable computers and the like may obtain power from fuel cells that consume fuel from fuel reservoirs of the portable devices. A network of fueling stations permits users of portable devices to main the devices operational by frequently topping up the fuel reservoirs. Payment systems combine payments for fuel with larger payments for other transactions to avoid the overhead of processing individual payments for very small amounts.

23 Claims, 5 Drawing Sheets

(51) Int. Cl.
*G06Q 20/20* (2012.01)
*G06Q 30/02* (2012.01)
*G06Q 30/06* (2012.01)
*G06Q 50/06* (2012.01)
*G07F 13/00* (2006.01)

(52) U.S. Cl.
CPC ............. *G06Q 30/06* (2013.01); *G06Q 50/06* (2013.01); *G07F 13/00* (2013.01); *H01M 8/04201* (2013.01); *Y02E 60/50* (2013.01)

(56) References Cited

U.S. PATENT DOCUMENTS

| | | | |
|---|---|---|---|
| 6,268,077 | B1* | 7/2001 | Kelley et al. .................. 429/33 |
| 6,326,097 | B1 | 12/2001 | Hockaday |
| 6,447,945 | B1* | 9/2002 | Streckert et al. .............. 429/34 |
| 6,665,549 | B1* | 12/2003 | Reed ............................. 455/573 |
| 6,713,201 | B2 | 3/2004 | Bullock |
| 6,755,225 | B1 | 6/2004 | Niedwiecki et al. |
| 6,756,765 | B2* | 6/2004 | Bruning ........................ 320/108 |
| 6,828,049 | B2 | 12/2004 | Bullock et al. |
| 6,850,755 | B2 | 2/2005 | Allande et al. |
| 6,850,996 | B2 | 2/2005 | Wagner |
| 6,873,851 | B2 | 3/2005 | Brown et al. |
| 2001/0041998 | A1* | 11/2001 | Ballard et al. .................... 705/8 |
| 2003/0021743 | A1 | 1/2003 | Wikstrom et al. |
| 2003/0153273 | A1 | 8/2003 | Ebert et al. |
| 2003/0153278 | A1* | 8/2003 | Johnson, Jr. .................... 455/74 |
| 2004/0016769 | A1 | 1/2004 | Redmond |
| 2004/0072049 | A1 | 4/2004 | Becerra et al. |
| 2004/0146769 | A1 | 7/2004 | Birschbach |
| 2004/0151962 | A1* | 8/2004 | Adams ........................... 429/34 |
| 2004/0175599 | A1 | 9/2004 | Ricks et al. |
| 2004/0205032 | A1 | 10/2004 | Routtenberg et al. |
| 2004/0265671 | A1* | 12/2004 | Chipchase et al. ............. 429/34 |
| 2005/0008908 | A1 | 1/2005 | Kaye et al. |
| 2005/0022883 | A1 | 2/2005 | Adams et al. |
| 2005/0023236 | A1 | 2/2005 | Adams et al. |
| 2005/0058877 | A1 | 3/2005 | Fujita et al. |
| 2005/0069746 | A1 | 3/2005 | Kabasawa |
| 2005/0074643 | A1 | 4/2005 | Adams et al |
| 2005/0153278 | A1* | 7/2005 | Groen et al. ..................... 435/5 |
| 2005/0155668 | A1 | 7/2005 | Finkelshtain et al. |
| 2006/0089844 | A1* | 4/2006 | Dickinson et al. ................ 705/1 |
| 2006/0170391 | A1 | 8/2006 | Lam |
| 2007/0084523 | A1 | 4/2007 | McLean |
| 2007/0144605 | A1* | 6/2007 | Horowitz et al. ............... 141/83 |

FOREIGN PATENT DOCUMENTS

| | | |
|---|---|---|
| CN | 1595692 A | 3/2005 |
| CN | 1647305 A | 7/2005 |
| CN | 101310297 B | 7/2013 |
| CN | 103354293 A | 10/2013 |
| EP | 1501145 A1 | 1/2005 |
| JP | 09190581 A | 7/1997 |
| JP | 10167398 A | 6/1998 |
| JP | 10-250799 A | 9/1998 |
| JP | 10283571 A | 10/1998 |
| JP | 11-086058 A | 3/1999 |
| JP | 2001307231 A1 | 11/2001 |
| JP | 2002161815 A | 6/2002 |
| JP | 2002-269633 A | 9/2002 |
| JP | 2003-049996 A | 2/2003 |
| JP | 2003187837 A | 7/2003 |
| JP | 2004-106891 A | 4/2004 |
| JP | 2005001973 A | 1/2005 |
| JP | 2005069331 A | 3/2005 |
| WO | WO-96/29751 A1 | 9/1996 |
| WO | WO 98/18172 A1 | 4/1998 |
| WO | WO-00/52779 A1 | 9/2000 |
| WO | WO 01/99222 A2 | 12/2001 |
| WO | WO-02/061861 A1 | 8/2002 |
| WO | WO-2005/001973 A1 | 1/2005 |
| WO | WO-2005055337 A2 | 6/2005 |

OTHER PUBLICATIONS

"International Application Serial No. PCT/CA2006/001577, Written Opinion mailed Jan. 22, 2007", 10 pgs.
"International Application Serial No. PCT/CA2006/001577, International Search Report mailed Jan. 22, 2007", (Jan. 22, 2007), 4 pgs.
"PANTRY INC, Securities Registration Statement (S-1/A)", (Feb. 4, 1999), [online]. [retrieved on Jan. 9, 2007]. Retrieved from the Internet: <URL:http://sec.edgar-online.com/1999/04/02/17/0000898430-99-001445/Section11.asp>, 3 pgs.
Azbel, I., "PayWord Micro-Payment Scheme. Strengths, Weaknesses and Proposed Improvements", Department of Computer Sciencce, University of Cape Town, South Africa, (1997), [online]. [retrieved on Jan. 9, 2007]. Retrieved from the Internet: <URL: http://citeseer.ist.psu.edu/21534.html>, (3 pgs.).
Gille, D., "The Efficiency of Decreasing Payment Amounts in Mobile Commerce and Ubiquitous Computing", *Proceedings of the 2005 Second IEEE International Workshop on Mobile Commerce and Services (WMCS'05)*, (Jul. 19, 2005),96-101.
Karnouskos, S., "Mobile Payment: A journey Through Existing Procedures and Standardization Initiatives", *IEEE Communication Surveys and Tutorials*, 6, 4, (2004), 44-66.
Kurtenbach, E., "China Company Starts Small with Hydrogen-Powered Car", Canadian Press, (Jul. 25, 2006), [retrieved on Jan. 9, 2007]. Retrieved from the Internet: URL:http//www.canada.com/topics/technology/news/gizmos/story.html?id-0cf108d9-22ad-4865-8bde-64d3d1ba9602&k=63224>, 2 pgs.
Smagala, D , "Japanese Experiences With B2C E-Commerce", *MIT Sloan Management Review*, 45(3), (Spring 2004), [online]. [retrieved on Jan. 9, 2007]. Retrieved from the Internet <URL:http://sloanreview.mit.edu.smr/issue/2004/spring/01b/>, 2 pgs.
"U.S. Appl. No. 11/232,912 Final Office Action mailed Sep. 2, 2010", 22 pgs.
"U.S. Appl. No. 11/232,912, Examiner Interview Summary Received Feb. 18, 2010", 3 pgs.
"U.S. Appl. No. 11/232,912, Non-Final Office Action mailed Feb. 3, 2010", 21 pgs.
"U.S. Appl. No. 11/232,912, Notice of Non-Compliant Amendment mailed Oct. 29, 2009", 1 pg.
"U.S. Appl. No. 11/232,912, Response filed Sep. 15, 9 to Restriction Requirement mailed Jun. 15, 2009", 8 pgs.
"U.S. Appl. No. 11/232,912, filed Nov. 3, 2009 to Notice of Non-Compliant Amendment mailed Oct. 29, 2009", 7 pgs.
"U.S. Appl. No. 11/232,912, filed Aug. 2, 2010 to Non Final Office Action mailed Feb. 3, 2010", 9 pgs.
"U.S. Appl. No. 11/232,912, Restriction Requirement mailed Jun. 15, 2009", 8 pgs.
"European Application Serial No. 06790742.8, Supplemental European Search Report mailed on Mar. 5, 2010", 9 pgs.
"Portable Fuel Cell Rental Program", *PR Newswire*, New York, (Aug. 30, 2005), 2 pgs.
"Singapore Application Serial No. 200802136-2, Response filed Oct. 22, 2009 to Written Opinion mailed Apr. 17, 2009", 14 pgs.
"Singapore Application Serial No. 200802136-2, Written Opinion mailed Apr. 17, 2009", 6 pgs.
"Singapore Application Serial No. 200802136-2, Response filed Jul. 6, 2010 to Second Written Opinion mailed Jan. 11, 2010", 8 pgs.
"Singapore Application Serial No. 200802136-2, Second Written Opinion mailed Jan. 11, 2010", 7 pgs.
Dyer, C. K., "Fuel cells for portable application", *Journal of Power Sources*, 106(1-2), (2002), 31-34.
Perez, R., "Hydrogen cars, filling stations to get state test", *Knight Ridder Tribune Business News*, Washington, (Jun. 24, 2005), 2 pgs.
"U.S. Appl. No. 11/232,912, Non Final Office Action mailed Jan. 13, 2011", 35 pgs.
"U.S. Appl. No. 11/232,912, filed Jan. 3, 2011 to Final Office Action mailed Sep. 2, 2010", 9 pgs.
Nice, Karim, et al., "How Fuel Cells Work", HowStuffWorks. com,http://auto.howstuffworks.com/fuel-efficiency/alternative-fuel/fuel-cell.htm, (Sep. 18, 2000).
"U.S. Appl. No. 11/232,912, Final Office Action mailed Jun. 24, 2011", 19 pgs.

(56) References Cited

OTHER PUBLICATIONS

"U.S. Appl. No. 11/232,912, filed Sep. 26, 2011 to Final Office Action mailed Jun. 24, 2011", 12 pgs.
"U.S. Appl. No. 11/232,912, filed Apr. 13, 2011 to Non Final Office Action mailed Jan. 13, 2011", 10 pgs.
"Chinese Application No. 200680042275.5, Response filed Sep. 26, 2011 to Office Action mailed Feb. 22, 2011", (w/ English Translation of Claims), 13 pgs.
"Chinese Application Serial No. 200680042275.5,Office Action mailed Feb. 22, 2011", (w/ English Translation), 8 pgs.
"U.S. Appl. No. 11/232,912, Examiner Interview Summary mailed May 31, 2012", 3 pgs.
"U.S. Appl. No. 11/232,912, Final Office Action mailed Feb. 24, 2012", 30 pgs.
"U.S. Appl. No. 11/232,912, filed May 24, 2012 to Final Office Action mailed Feb. 24, 2012", 9 pgs.
"Chinese Application Serial No. 200680042275.5, Office Action mailed Mar. 31, 2012", w/ English Translation, 7 pgs.
"Chinese Application Serial No. 200680042275.5, Response filed Jun. 15, 2012 to Office Action mailed Mar. 31, 2012", (w/ English Translation of Claims), 12 pgs.
"U.S. Appl. No. 11/232,912, Non Final Office Action mailed Aug. 20, 2013", 33 pgs.
"Canadian Application Serial No. 2,622,803, Amendment filed Oct. 5, 2011", 18 pgs.
"Canadian Application Serial No. 2,622,803, Office Action mailed Oct. 23, 2013", 6 pgs.
"Chinese Application Serial No. 200680042275.5, Office Action mailed Oct. 31, 2012", w/English translation, 7 pgs.
"Chinese Application Serial No. 200680042275.5, Response filed Jan. 14, 2013 to Office Action mailed Oct. 31, 2012", w/English translation of claims, 11 pgs.
"Electrochemistry Dictionary", [Online]. Retrieved from the Internet: <http://web.archive.org/web/20040207185551/http://electrochem.cwru.edu/ed/dict.htm>, (Feb. 7, 2004), 1 pg.
"Japanese Application Serial No. 2008-531495, Office Action mailed Feb. 12, 2014", 2 pgs.
"Japanese Application Serial No. 2008-531495, Office Action mailed Apr. 2, 2013", w/English translation, 8 pgs.
"Japanese Application Serial No. 2008-531495, Office Action mailed Jul. 31, 2012", 2 pgs.
"Japanese Application Serial No. 2008-531495, Response filed Apr. 4, 2014 to Office Action mailed Feb. 12, 2014", w/English abstract, 6 pgs.
"Japanese Application Serial No. 2008-531495, Response filed Sep. 9, 2013 to Office Action mailed Apr. 4, 2013", w/English abstract, 8 pgs.
"Japanese Application Serial No. 2008-531495, Response filed Nov. 16, 2012 to Office Action mailed Jul. 31, 2012", w/English abstract, 6 pgs.
"Japanese Application Serial No. 2012-252155, Office Action mailed Dec. 17, 2013", w/English translation, 10 pgs.
"Japanese Application Serial No. 2012-252155, Response filed Mar. 17, 2014 to Office Action mailed Dec. 17, 2013", w/English translation of claims, 13 pgs.
"Korean Application Serial No. 2008-7009717, Amendment filed Oct. 26, 2011", 14 pgs.
"Korean Application Serial No. 2008-7009717, Office Action mailed Nov. 26, 2013", w/English translation, 13 pgs.
"Korean Application Serial No. 2008-7009717, Office Action mailed mailed Mar. 28, 2013", w/English translation, 9 pgs.
"Korean Application Serial No. 2008-7009717, Response filed Aug. 19, 2013 to Office Action mailed Mar. 28, 2013", 115 pgs.
"State of Charge (SOC) Determination", "Performance Characteristics", "Battery and Energy Technologies", MpowerUK, [Online]. Retrieved from the Internet: <http://web.archive.org/web/20050717234734/http://www.mpoweruk.com/soc.htm>, (Jul. 17, 2005), 9 pgs.
Jiang, Zhenhua, et al., "Design and testing of a fuel-cell powered battery charging station", Department of Electrical Engineering, University of South Carolina, Journal of Power Sources, 5158, (Dec. 4, 2002), 1-9.
Dutton; "Hydrogen Energy Technology"; Tyndall Centre for Climate Change Research; Working Paper 17; Apr. 2002; 34 pages.

\* cited by examiner

REPLENISHING FUEL CELL POWERED PORTABLE DEVICES

CROSS-REFERENCE TO RELATED APPLICATIONS

This application is a nationalization under 35 U.S.C. 371 of International Patent Application No. PCT/CA2006/001577, filed Sep. 25, 2006 and published as International Patent Publication No. WO 2007/033494 A1 on Mar. 29, 2007, which is a continuation under 35 U.S.C. 120 of U.S. patent application Ser. No. 11/232,912, filed Sep. 23, 2005 now abandoned, which applications and publication are incorporated herein by reference and made a part hereof.

TECHNICAL FIELD

This invention relates to portable devices that use fuel cells, or other energy conversion devices, to obtain electrical power from fuel. The invention relates particularly to systems and methods for replenishing fuel reservoirs in such portable devices.

BACKGROUND

Portable electronic devices such as portable telephones (which include cellular telephones, mobile telephones and other portable telephones), music players, portable computers, personal digital assistants, digital cameras, video camcorders, radio receivers, radio transceivers, navigation devices, combinations of these, and the like are becoming indispensable tools for business and personal affairs. Such devices are referred to herein as "portable devices" or "portable electronic devices". Portable devices are small and lightweight enough to be carried conveniently by a person. There is increasing demand for portable devices that are very compact, light in weight and yet full-featured.

Most portable electronic devices are powered with electricity from batteries. Primary batteries must be replaced once their energy has been consumed. Although they are convenient, primary batteries can be unacceptably expensive for devices that have high energy requirements. Making and disposing of primary batteries both create waste that could harm the environment.

Secondary batteries can be used multiple times and recharged after each use. However, recharging can be inconvenient. The rate at which batteries can be charged safely is limited. Most recharging technologies require from minutes to hours to recharge a secondary battery. Although better secondary battery technologies are being developed, secondary batteries tend to be heavy and can degrade over time. Frequent fast or partial charging can cause the performance of rechargeable batteries to degrade at an accelerated rate.

Fuel cells convert energy from a fuel, such as hydrogen or methanol, into electricity. Fuel cells are an attractive power source for portable electronic devices, in part because they have the potential to provide higher energy densities than most battery technologies. Thus, a fuel-cell-powered device can potentially offer extended runtime and/or higher power output than a comparable battery-powered device. Another advantage of fuel-cells for powering portable devices is that refueling can be accomplished much more quickly than recharging a storage battery. Fuel cell performance remains relatively constant under a wide range of working conditions.

Several fuel cell technologies being developed for portable applications supply fuel in replaceable fuel cartridges. The fuel cartridges are not refillable by a user. Examples of such cartridge-based technologies include:
Mobion™ from MTI MicroFuel Cells Inc. of Albany N.Y.
The power supplies being developed by Medis Technologies Ltd. of New York, N.Y.
U.S. Pat. No. 6,665,549 discloses a system for replenishing power sources for mobile devices that may include a fuel cartridge dispenser.
U.S. Pat. No. 6,326,097 discloses micro fuel cell power chargers that include disposable fuel ampoules or refillable fuel tanks.
US 2004/0146769 discloses a fuel cell cartridge for portable electronic devices.
US2004/0151962 discloses a fuel cartridge for direct methanol fuel cells.
US2005/0023236 discloses a fuel cartridge with a flexible liner that is connectable to a fuel cell.
US2005/0074643 discloses fuel cartridges for fuel cells.
US2005/0022883 discloses a fuel cartridge with a connecting valve for connecting the fuel cartridge to a fuel cell or to a refilling device.

A device that requires pre-filled fuel cartridges for operation has many of the same disadvantages as a device that uses primary batteries for power. Multiple cartridges must be purchased and kept on-hand to maintain the operation of the device. The cost of cartridges becomes a major consideration, especially when used in devices that have high power requirements. The cost of a cartridge can be significantly more than the cost of the fuel contained within the cartridge because cartridges must contain the fuel safely and, provide reliable mechanisms to keep the fuel inside the cartridge until it is desired to supply the fuel to a device and connect to supply fuel to the device without leaking fuel. Further, cartridges should be replaced only when the current cartridge is fully spent. A cartridge that is not completely spent will contain waste fuel with economic, environmental and/or safety implications for disposal Experience with primary batteries suggests that users will find pre-filled cartridges satisfactory only if the time between cartridge replacements is long or the cost of cartridges is extremely low. Achieving either of these objectives is difficult. Designing inexpensive cartridges is difficult because such cartridges must safely contain flammable fuels. Designing cartridges that are long-lasting requires either large volumes or more-expensive fuel storage technologies.

Some fuel-cell-powered devices have on-board fuel reservoirs. The on-board fuel reservoirs can be refilled with fuel. Non-limiting examples of fuels that could be used to power a fuel-cell-powered device are hydrogen; methanol; formic acid; butane; and borohydride compounds. Fuel can be added to an on-board fuel reservoir either through application of a field refueling cartridge or through the use of a fixed fueling station. For example:
US 2005/008908 describes a portable hydrogen storage device that can be used to transfer hydrogen fuel to a portable electronic device such as a laptop computer.
US2005/0155668 describes a refilling system for fuel cells.
US2004/0175599 discloses fuel cell replenishment using a cartridge.
US2004/0072049 discloses a fuel container and delivery apparatus for a liquid-fuel cell system.
US2004/0205032 describes a network of refilling stations for hydrogen-powered vehicles.

U.S. Pat. No. 6,755,225 discloses a transportable hydrogen refilling station for dispensing gaseous hydrogen from high pressure tanks.

US2003/0021743 discloses a fuel cell refueling station and system.

Providing a portable device having a refillable fuel reservoir does not provide a complete solution to the above problems because of the high cost of fueling stations relative to the portable devices that they service. Even having a home fueling station is not ideal since a portable device may run low on fuel while its user is not at home.

While portable devices powered by fuel have a number of advantages over battery-powered devices, some of which are outlined above, there is a need for cost-effective and convenient ways to replenish the fuel supplies in such devices.

SUMMARY

The inventor considers that a system including a network of geographically-distributed stations for replenishing the fuel in portable devices would make it very convenient to use such devices. Such a system could exploit the fact that a device can be refilled with fuel in a time that is much shorter than the time that would be required to recharge a secondary battery. There is a significant capital cost associated with a fueling station. This cost typically far exceeds the initial cost of a fuel-cell-powered portable device. Therefore, individual users are unlikely to be able to justify the purchase of fueling stations for their personal use. Further, even if a user has a fueling station, the portable device would need to be brought to the fueling station each time it is desired to fill the portable device with fuel. This would be inconvenient.

A further obstacle is that a typical portable device can accept only a relatively very small amount of fuel at one time. Such a small amount of fuel has a low intrinsic value. The cost of processing such a small transaction can approach or even exceed the value of the fuel. A complete refueling of a portable fuel cell powered device may involve a transfer of on the order of 10 Wh or even less energy. Partial, top-up, refuelings may involve the exchange of less energy still. By contrast, fueling a vehicle, such as a car, may involve transferring on the order of 500 kWh of energy. A vehicle refueling transaction is significant enough to support the overhead associated with processing payment. In contrast, processing payment for a refueling transaction for a low-powered portable device could involve costs that are out of proportion to the size of the transaction.

The inventor has developed a business model and associated systems and methods that can make it viable to provide and support a network of geographically-distributed stations for replenishing portable devices with small amounts of fuel. The availability of such a network may provide enhanced convenience for users of portable electronic devices. By providing ubiquitous fueling stations, such a network can permit the almost instantaneous 'top up' of fuel reservoirs in portable devices at times most convenient to users. The use of such a network can eliminate the overhead costs and potential wastefulness of cartridge only refueling.

Various example embodiments of the invention which illustrate additional aspects and features of the invention are described below. The various embodiments described herein are examples only. Features of these embodiments may be combined or altered in ways that will be understood to those skilled in the in light of this disclosure.

BRIEF DESCRIPTION OF THE DRAWINGS

Example embodiments of the invention are illustrated in the appended drawings. The embodiments disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

This invention provides systems that include a network of geographically-distributed stations for refilling portable devices with fuel. The stations may be used to rapidly refuel or top-up fuel reservoirs on small fuel-cell-powered devices. When such systems include a large number of fueling stations in a wide range of convenient locations, a user of a portable fuel-cell-powered device will find it simple and convenient to keep the device charged with fuel so that the user can enjoy uninterrupted operation of the device. The fuel-cell-powered devices may comprise fuel cells that generate electricity to operate the portable devices. By way of example, the device may be a portable fuel-cell-powered portable telephone (such as a cellular telephone or other portable telephone), music player, video player, personal digital assistant, digital camera, video camcorder, computer, radio receiver or transceiver, power tool, or any other fuel-cell-powered portable device. In some cases a user may replenish fuel reservoirs in one, two, or more portable devices using the fueling stations of the network.

Setting up and maintaining a network of fueling stations for portable devices may involve significant expense. Users will use such a network only if it is both convenient and affordable. There are various ways that a user may pay for access to such a network. These include:

Paying an amount that is variable based on the quantity of fuel consumed.

Paying a flat rate for each refill or top up (with a possible maximum quantity of fuel allowed per refill or top-up).

Paying a set amount for access to the network during a specified time frame.

Paying for (or being potential customers for) another product or service and obtaining access to the network as an incident thereof.

The example systems described below support various of these payment mechanisms.

Figure 1:
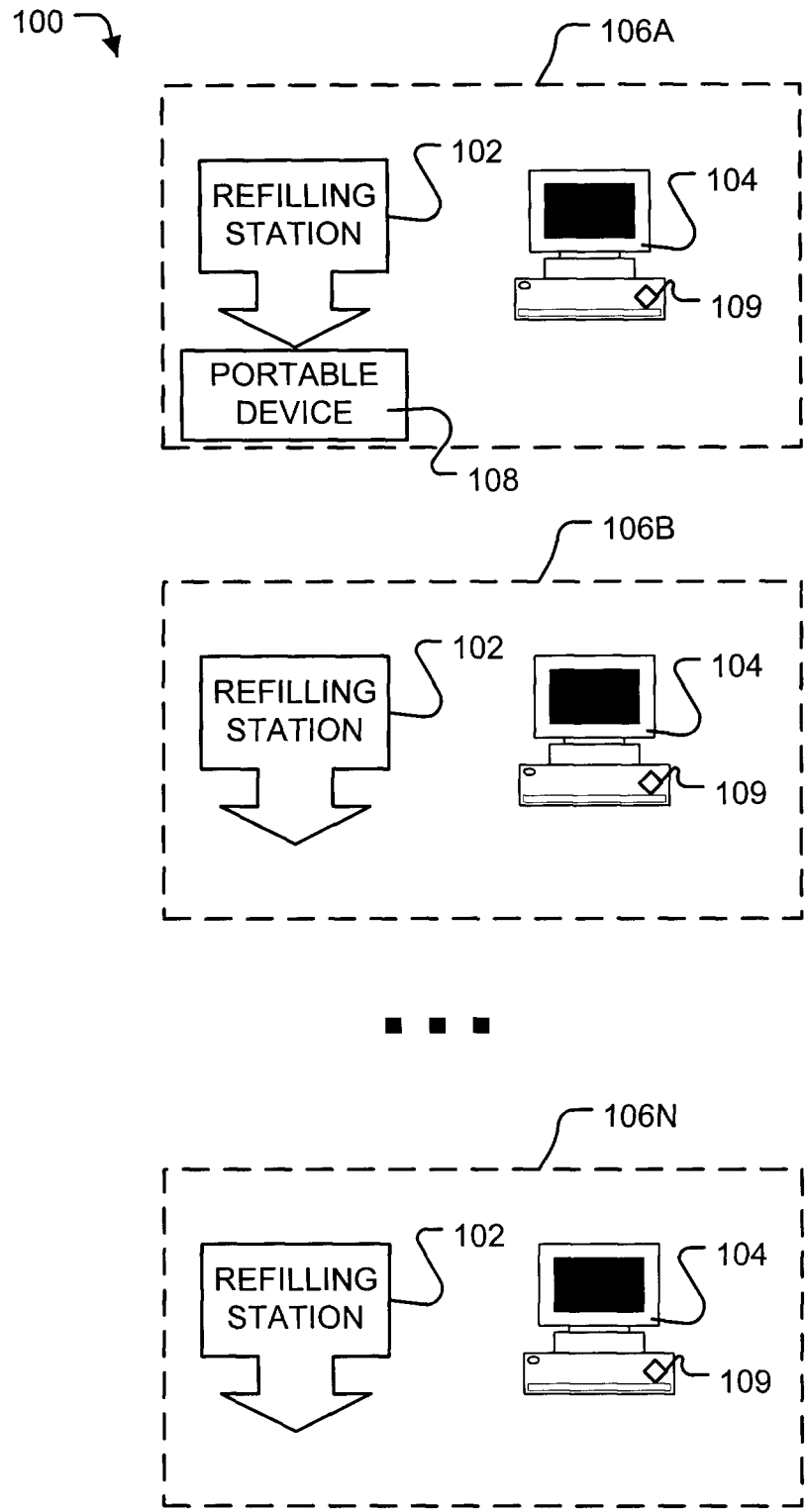
FIG. 1 is a schematic view of a system according to a simple embodiment of the invention.
Figure 2:
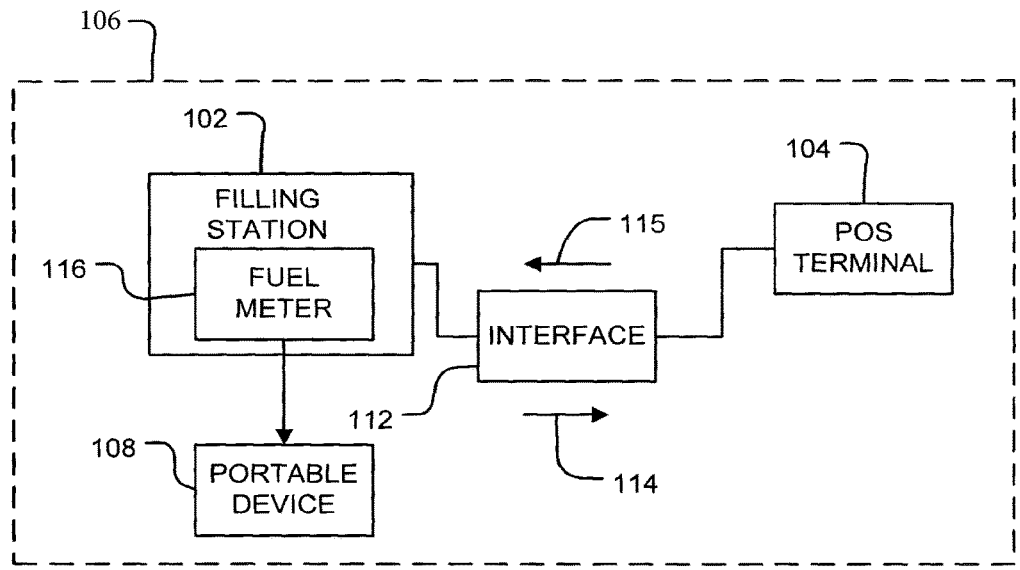
FIG. 2 is a schematic view of a fueling station and POS terminal that are interconnected to provide a means for automatically adding a cost for a refueling transaction to another transaction.
Figure 4:
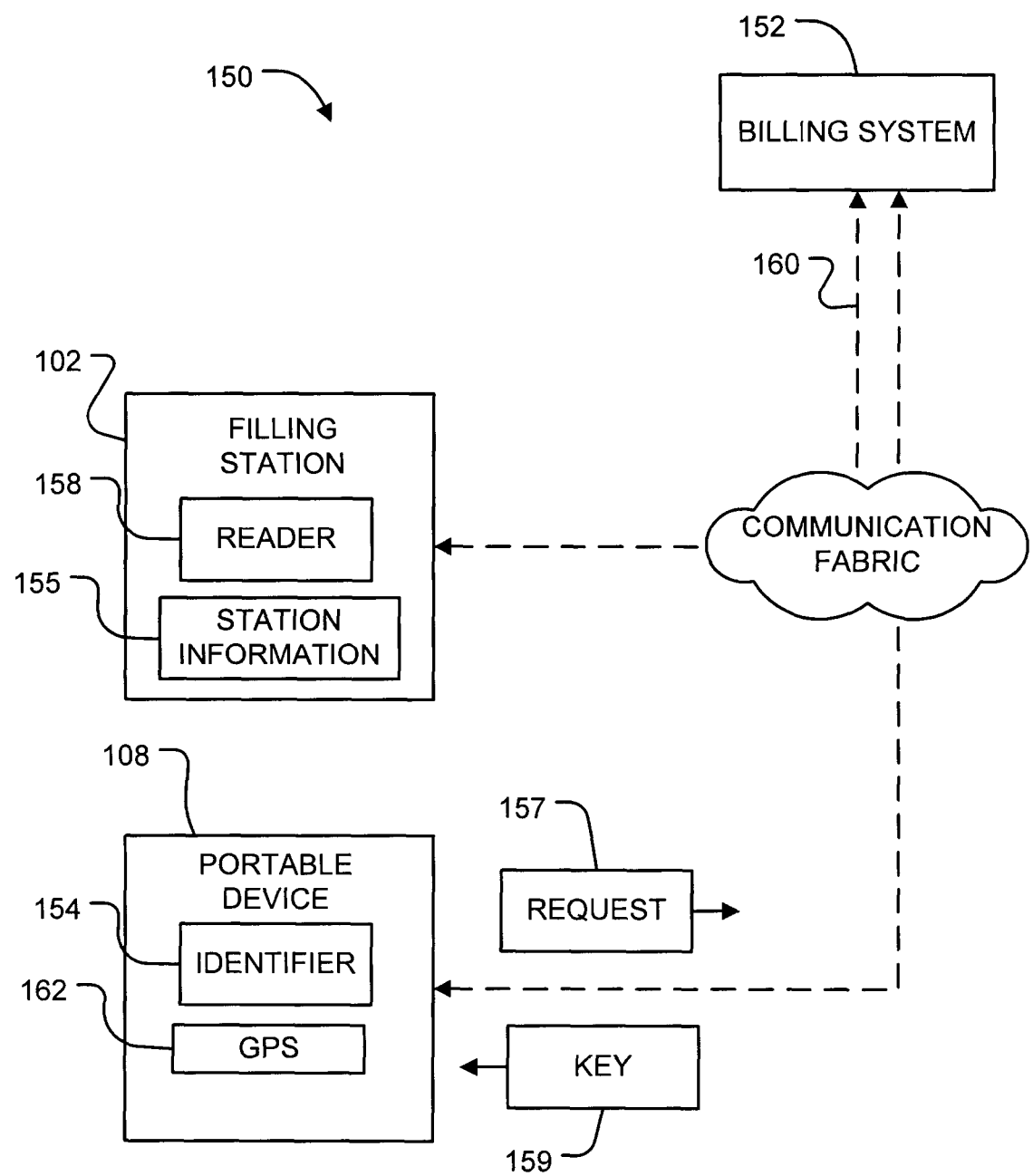
FIG. 4 is a schematic view of a system according to another embodiment of the invention in which payments for refueling transactions are processed by an independent billing system, such as a billing system for a telephone company.

In cases where a separate payment is made each time a portable device is refilled the system must accommodate the problem that each separate payment may be relatively very small. Portable devices may only carry a small amount of fuel with a low intrinsic value. A payment amount may be only a few cents, for example. In some cases, a payment could even be a fraction of a cent. The overhead associated with processing such small payments can be out of proportion to the amount of the payments. FIGS. 1, 2 and 4 illustrate systems that can avoid or eliminate this problem.

Consumers in some locations or markets may be willing to pay larger amounts for fueling their portable devices. The systems described herein may charge higher prices for refueling transactions in such locations or markets.

FIG. 1 shows a system 100 that comprises a plurality of fueling stations 102. Each fueling station 102 is located at a retail establishment 106A, 106B, . . . 106N (collectively establishments 106) at which goods or services are sold to members of the public who include prospective users of system 100. Each retail establishment 106 includes a cash register or POS terminal 104 used to process sales transactions for the retail establishment 106.

In the embodiment of FIG. 1, when a customer of a retail establishment 106 makes a purchase of one or more products or services, an employee of the retail establishment 106 processes payment for the purchase using POS terminal 104 in a payment transaction. The customer may optionally choose to refill a portable device 108 with fuel (this may involve filling an internal reservoir in the portable device 108 or filling a cartridge that can be connected to supply fuel to the portable device 108) using the fueling station 102 of the retail establishment 106 (in the illustrated example, the customer is at retail establishment 106A).

If the customer makes this choice then a suitable amount is added to the payment transaction, which is then processed. The customer may make payment by credit card, debit card, prepaid card, cash, cheque, or any other mode of payment accepted by the retail establishment. The act of refueling the portable device from the fueling station may be performed while the payment transaction is being carried out. For example, in many embodiments, refueling is performed in 30 seconds or less since only a small quantity of fuel must be transferred to the portable device. Therefore, a user will not need to spend significant additional time to have their portable device refilled with fuel.

It can be appreciated that combining the payment for refueling a portable device 108 with payment for some other good(s) or service(s) avoids incurring overhead for processing a separate payment transaction for refilling the portable device with fuel. The system may permit users to purchase fuel refills for a portable device in a transaction separate from any other transaction. A premium price may be applied to such separate transactions to account for the overhead in processing the separate transaction.

The system illustrated in FIG. 1 as a number of other advantages including:

A cashier operating POS terminal 104 can also connect the portable device 108 to fueling station 102 and oversee the refueling of portable device 108. The cashier may be provided with appropriate training. This avoids the problem that some jurisdictions may have regulations which prohibit self-service dispensing of certain fuels by untrained consumers.

Since there is substantially no overhead associated with processing payment for the refueling, the cost for refueling may be kept small, thereby making it practical for users of portable devices to refuel the portable devices frequently. If the cost per refueling transaction is very small then a user will be comfortable to top up the fuel supply in a portable device even if the portable device is far from being empty of fuel.

Operation of system 100 may be facilitated by providing a button 109 or other user interface control on POS terminal 104 that is pre-programmed or otherwise configured to add a small set amount for refueling a portable device to the current sales transaction. In some embodiments a cashier operates such a user interface control if a customer wishes to refuel a portable device. POS terminal 104 may have a second button log or other suitable user interface control which initiates a separate sales transaction for a larger amount to cover refueling alone. In the alternative, POS terminal 104 may be programmed to charge a certain price for fueling a portable device in a stand alone transaction and a reduced price for fueling the portable device as part of a combined transaction. In some embodiments, the price charged for fueling a portable device is determined calculated, at least in part, based upon a value of the sales transaction. For example, the price charged to the user for fueling a portable device could be reduced or eliminated for larger sales transactions.

FIG. 2 shows schematically a retail establishment 106 having a fueling station 102 that is coupled to a POS terminal 104 by interface 112. Interface 112 facilitates automatically adding the cost for a refueling transaction to another purchase transaction. In one embodiment, when fueling station 102 operates to refill the fuel reservoir in a portable device 108, interface 112 carries a signal 114 indicating that a refill has been performed. In response to signal 114, POS terminal 104 adds an appropriate payment amount for the refill transaction to another payment transaction for the customer and subsequently processes the payment transaction.

Signal 114 may include information that specifies the payment amount to be charged for the refueling transaction. Optionally, fueling station 102 comprises a fuel meter 116 that measures the amount of fuel dispensed to refill a portable device. In this case, signal 114 may encode information indicating the amount of fuel dispensed. The precise character of signal 114 will depend upon whether refills are to be charged at a flat rate or based upon a measure of the volume of fuel delivered and also upon how determination of the payment amount to be charged for the refill is distributed between fueling station 102 and POS terminal 104. For example signal 114 may:

simply indicate that a refill has been performed by fueling station 102;

encode a flat-rate payment amount to be added by POS terminal 104 to a payment transaction;

indicate an amount of fuel transferred to a portable device 108 (POS terminal 104 can then compute a payment amount that could be based entirely or in part on the amount of fuel transferred); or encode a payment amount based entirely or in part on the amount of fuel transferred to be added by POS terminal 104 to a payment transaction.

Signal 114 may be generated by control circuits (which may include a programmable controller executing software instructions and/or other suitable control hardware) of fueling station 102 and may be received by a data processor in POS terminal 104.

In the alternative, or additionally, interface 112 may carry signals 115 from POS terminal 104 to fueling station 102. Fueling station 102 may be configured to require a suitable signal 115 authorizing it to operate before it is operable to refill a portable device 108.

Interface 112 may comprise any suitable wired or wireless interface capable of conveying signals 114 and/or 115 between fueling station 102 and POS terminal 104.

In the network of FIG. 1, some or all of retail establishments 106 may have an interface 112 connecting POS terminal 104 to fueling station 102.

Figure 3:
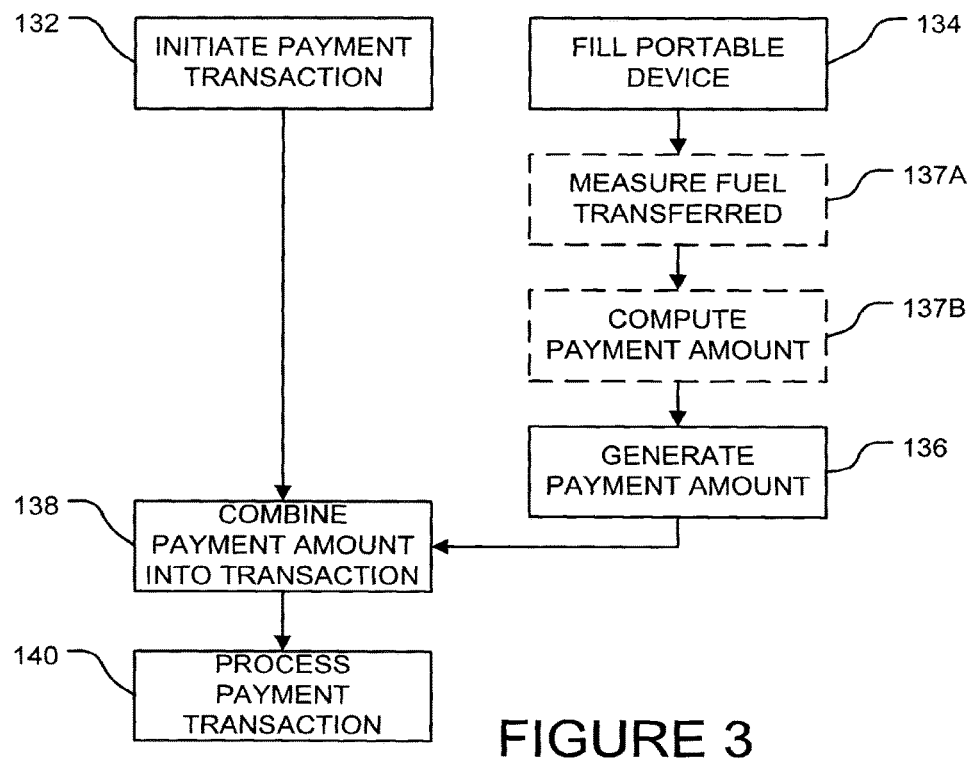
FIG. 3 is a flow chart illustrating a method that may be performed in conjunction with a system such as that of FIG. 1 or FIG. 2.

FIG. 3 shows a method 130 that may be practised in conjunction with network 100 of FIG. 1. In block 132 a payment transaction for goods or services is initiated. Block 132 may comprise a cashier beginning a new transaction at a cash register or other POS terminal. In block 134 a portable device is refilled with fuel at a fueling station. In associated block 136 a payment amount for refueling the portable device is generated. Block 136 may be performed automatically by way of an interface connecting a fueling station to a POS terminal or entirely or partly manually, for example, by a cashier manually entering a charge for refueling at a cash register or a cashier pushing a programmed button on a POS terminal. In block 138 the payment amount for refueling is combined into the payment transaction. In block 140 the combined payment transaction is processed to pay for both the goods and/or services and refueling the portable device. In some embodiments, the payment transaction for the goods and/or services is for an amount of money that is much greater than the payment amount for fueling the portable device. The payment for the goods and services may exceed the payment amount for fueling by a factor of 40 or more and in many cases by a factor of 200 or more.

In optional step 137A an amount of fuel transferred to the portable device is measured. In optional step 137B the payment amount for refueling the portable device is computed based at least in part upon the measured amount of fuel transferred. The timing of the various blocks in method 130 can be varied. Blocks 132 and 136 can be performed simultaneously or in any order prior to block 138. Block 134 may be performed before, during or after blocks 132, 136 and 138. In some embodiments, block 134 is performed concurrently with some or all of blocks 132, 136 and 138.

Consider the following example. Retail establishment 106A is a coffee shop. A customer at the coffee shop has a fuel-cell-powered portable telephone that uses hydrogen gas as a fuel. The user orders a large cup of coffee priced at $1.50 and a muffin priced at $1.75. Noticing that retail establishment 106A has a fueling station 102, the user requests a fuel refill. The cashier of retail establishment 106A rings in the user's coffee and muffin purchases, connects the user's fuel-cell-powered portable telephone 108 to fueling station 102 and presses button 109 on POS terminal 104. While the transaction is being completed, the user's telephone 108 is charged. In response to the press of button 109, POS terminal 104 adds 2¢ to the current transaction. When the cashier indicates that the transaction is complete, POS terminal 104 computes and adds applicable taxes to the $3.27 in charges. The user pays for the entire transaction with a debit card.

An hour later, the user stops at retail establishment 106B, which is a newsstand, to purchase a magazine and a chocolate bar. The operators of the newsstand allow customers free use of fueling station 102 to promote sales. Even though the user's portable telephone was filled at retail establishment 106A and could run for several more hours without refueling, the user (or the cashier of the newsstand) connects the user's portable telephone 108 to fueling station 102 and tops up its fuel supply. This results in the transfer of only a small amount of fuel, however, the user has the comfort of knowing that the portable telephone 108 is filled with fuel.

Two more hours later, the user stops at retail establishment 106C, which is an automobile filling station. The user fills his car with gasoline. When the user pays for the gasoline, the cashier connects the user's portable telephone 108 to fueling station 102 and presses button 109 on POS terminal 104. In response to the press of button 109, POS terminal 104 determines that the current transaction is over a threshold amount and so does not charge for refueling the portable telephone 108. If the gasoline purchase had been for less than the threshold amount, POS terminal 104 would have added a small amount (e.g. 1¢ to the amount of the transaction). POS terminal 104 may include a process or executing software instructions which cause it to perform these actions.

It is not necessary that all of fueling stations 102 be commonly owned or managed. The business that operates a retail establishment 106 may own, lease or rent a fueling station 102. In the alternative, fueling stations 102 may be placed by an independent business that places and services fueling stations 102 in much the same way that some businesses operate networks of vending machines. As network 100 becomes popular, retail establishments are motivated to have recharging stations 102 because customers will seek out retail establishments at which they can refill their portable devices with fuel.

Fueling stations 102 are not necessarily located only at retail establishments. Other establishments may provide fueling stations 102 for the convenience of their customers even if customers do not pay for goods and services each time they partake of services at the establishment. For example, libraries, gyms, clubs, bars etc. may provide fueling stations 102 as a service to their patrons.

In any of the embodiments described herein, it is particularly beneficial if retail establishments 106 include a wide range of different types of establishment such that a user who is going about his or her normal daily routine will likely do business with several of retail establishments 106 during the course of their day. It is particularly beneficial if fueling stations 102 are distributed geographically over a wide area so that a user can readily find a fueling station 102 wherever he or she goes within the area. It is also particularly beneficial if fueling stations 102 are fairly densely distributed within the area so that the user will not need to spend energy seeking fueling stations 102 but, with a high probability, will come upon fueling stations 102 frequently enough during the course of a typical day's activities that the user will never be at risk of running out of fuel for the portable device 108.

FIG. 4 shows a network 150 according to another embodiment of the invention. Network 150 allows the refilling of portable devices with fuel to be authorized and/or paid for through the use of an outside billing system 152. The internal design of billing systems 152 is known to those skilled in the art of designing billing systems. Billing systems suitable for telephone networks, internet service providers, cable television providers, newspaper publishers, banks, utility companies, and the like are in common use and are well understood by those skilled in the art of their design. Such billing systems typically generate bills periodically (e.g. monthly) for large numbers of consumers.

There are at least three broad ways in which a fueling station 102, device 108 and billing system 152 can cooperate automatically to authorize a fueling station to provide fuel to a particular device 108. These are:

Fueling station 102 can negotiate with billing system 152 for approval to fill portable device 108 after accessing information, identifying the device 108 to be refueled. The information may be retrieved from the device 108.

The device 108 to be refueled negotiates with billing system 152 for approval (optionally after accessing information from the fueling station 102), and then communicates an approval key to the fueling station 102.

The device 108 to be refueled is 'pre-approved' and communicates a pre-approval key to fueling station 102.

Any of these mechanisms can be implemented in a way which makes it unnecessary for the user to follow, or even to know any details about, the process of authorizing a fueling station 102 to transfer fuel to a user's portable device 108.

Outside billing system 152 may be a system on which users of portable devices already have accounts for some other purpose. In some embodiments the other purpose may have no direct relationship to the portable device or its use. In some other embodiments the outside billing system bills for goods or services related to the operation of the portable device. For example: the portable device may comprise a portable telephone and the outside billing system may be a billing system of a telephone company; the portable device may comprise a music player and the billing system may be the billing system of a music provider; or the like. Outside billing system 152 may be associated with one or more of:

a loyalty program;
a credit program;
a debit program;
a pre-paid service plan;
or the like.

Network 150 comprises a plurality of fueling stations 102. Only one fueling station 102 is shown. A system 150 could have dozens, hundreds or thousands of fueling stations 102. Each portable device 108 to be refueled by fueling stations 102 of network 150 has an identifier 154. Identifier 154 comprises information stored within or otherwise associated with a portable device that can be communicated to billing network 152 to verify that the portable device is authorized to use the fueling stations 102 of network 150 and/or to identify an account to which refueling costs can be charged.

Identifier 154 may optionally include information about one or more of: the portable device, its fuel requirements, its energy source, procedures for transferring fuel to the portable device, a resource identifier for a source of external information relating to the portable device.

In one embodiment, fueling stations 102 include readers 158 that read information from the identifiers 154 of portable devices that are presented to the fueling station 102 for filling. The fueling station can communicate with billing system 152 by way of a communication path 160. Fueling station 102 makes a request to billing system 152 to fill a portable device 108. The request includes information from or based on information from the identifier 154 of the portable device 108. Billing system 152 checks the request to determine whether the portable device is authorized to be filled (e.g. to check whether there is an account on billing system 152 associated with the portable device 108 and/or whether any account restrictions as to factors such as time of day, day of week, time since last refill or the like have been met). If so, billing system 152 sends a message to fueling station 102 authorizing the fueling station 102 to refill the portable device 108 with fuel. If not, billing system 152 does not authorize operation of the fueling station and the transfer of fuel from the fueling station to the portable device does not proceed.

As with system 100 described above, a payment amount for refueling a portable device 108 may be a flat rate amount or may be based on an amount of fuel transferred to the portable device 108. If the payment is based upon an amount of fuel transferred to the portable device then fueling station 102 communicates information indicative of the amount of fuel transferred to billing system 152.

Communication of information from identifier 154 to fueling station 152 may be performed using any suitable wired or wireless communication technology. Many alternative kinds of identifier 154 may be used. Some examples are:

optical bar codes;
optically-readable text, numbers or other indicia;
smart chips;
data stored in a memory accessible to a processor of the portable device;
mechanical keys;
electronic identifiers communicating either using a hard-wired connection or via some sort of wireless (IR, RF) communication;
RFID Tags; and,
the like.

Communication path 160 may comprise a wide area network, the internet, a telephone line, a wireless connection or some combination of these, for example.

Other embodiments take advantage of communication capabilities of portable device 108 which may, itself, have communications capability. Such embodiments are practical where portable device 108 is a portable telephone, portable computer with wireless connectivity, e-mail appliance, or the like. In such embodiments, portable device 108 may gather information regarding a fueling station 102 to which it is connected and automatically negotiate a refueling transaction with billing system 152. Portable device 108 may contain software instructions which cause the portable device 108 to negotiate with billing system 152 according to a set protocol.

Portable device 108 sends a service request 157 to billing system 152. Service request 157 may be based upon both information about the portable device 108, which may be obtained from internal identifier 154, and information 155 regarding the fueling station 102. Information 155 may comprise information from an identifier stored in or associated with fueling station 102 or geographical coordinates of fueling station 102 as determined by a global positioning system 162 associated with portable device 108, for example. Information 155 could be a very simple piece of information (connected/not connected) or could comprise a more detailed set of information comprising one or more of:

information about the state of fueling station 102;
information about the cost for refueling the portable device using the fueling station 102;
combinations of these; and,
the like.

Billing system 152 returns a digital key 159 to the portable device 108. Portable device 108 provides the digital key 159 or information derived from the digital key 159 to the fueling station 102. In response to receipt of digital key 159, fueling station is made operable to refill portable device 108 with fuel.

Portable device 108 may communicate with fueling station 102 in any suitable manner. Some possible examples are:
- a short range infrared communication link;
- a short range wireless link such as a wireless link operating on the Bluetooth protocol;
- an optical or electrical connection made when portable device 108 is engaged with fueling station 102; or
- the like.

Service request 157 may be carried in any suitable manner and have any suitable format. In some embodiments, service request 157 comprises a telephone call made to a telephone number associated with billing system 152. The telephone number is set up so that calls to the number automatically result in a small charge in an appropriate flat rate refueling amount being added to the account of the calling party. This may use existing mechanisms for charging for telephone calls. In other service request comprises transmitting digital data to billing system 152. Billing system 152 can then add to the user's next bill an amount to cover the user's use of network 150 to refuel portable device 108.

The key 159 provided by billing system 152 may, for example, be encrypted using a suitable public key encryption system.

The system may be set up to permit a user to pay for use of the system together with other services. For example, payment could be based on any of:
- a flat rate for use of the system during a certain calendar period;
- a rate determined in whole or in part by the number of times a user has refilled a portable device during a billing period;
- a rate determined in whole or in part by an amount of fuel received by a user's portable device(s) during a billing period
- or the like.

An advantage of embodiments which exploit communications capabilities of portable devices 108 is that, in such embodiments, it is not mandatory to provide fueling station 102 with a communications system that would permit communication directly between fueling stations 102 and a remote system. All that is required is some way for fueling station 102 to communicate with portable device 108.

Figure 5:
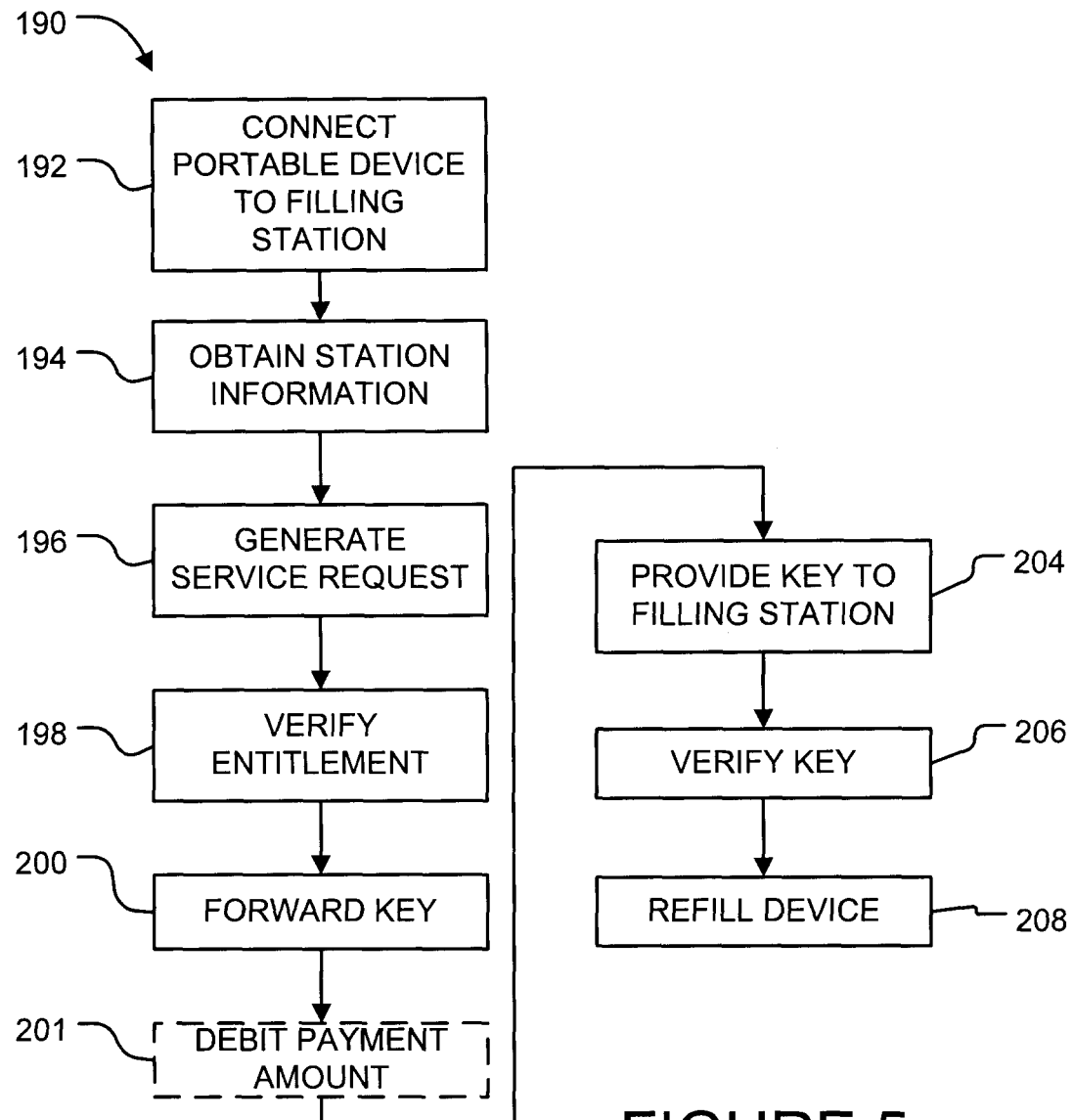
FIG. 5 is a flow chart illustrating a method that may be performed in conjunction with the system of FIG. 4.

FIG. 5 is a flow chart illustrating a method 190 that may be performed in conjunction with system 150 of FIG. 4. In block 192 a user connects a portable device 108 to a fueling station 102. In block 194 the portable device receives information that at least can be used to identify the fueling station 102. In block 196 the portable device generates and forwards to a billing system a service request. In block 198 the billing system 152 verifies from information in the service request that the portable device is entitled to be refueled (e.g. that the user of the portable device 108 has a current account on billing system 152). In block 200 billing system 152 generates and forwards to portable device 108 a digital key and in block 201 creates a transaction record. Block 201 may include creating a debit for a payment amount for the fueling transaction and applying the debit to an account with which the portable device 108 is associated. Creating a debit is optional if the user has a flat-rate or "unlimited" plan. In block 204, portable device 108 provides the digital key to fueling station 102. In block 206 fueling station 102 verifies the digital key. In block 208 fueling station 102 operates to refill portable device 108 with fuel.

Method 190 can be varied. It can be seen that a basic scheme of method 190 is:
- A user determines that a fueling transaction is desirable;
- A relevant external billing system or 'approval authority' is identified and a service request is made; and,
- Upon approval, the fueling station transfers fuel to the portable device.

Method 190 may have additional features. For example:
- There may be some required reporting back to the billing system.
- There may be a negotiation between the portable device and the fueling station to determine whether a refueling transaction is possible or desirable. A refueling transaction could not be performed in situations such as: the portable device is already full of fuel, the fueling station has no fuel or is not operating properly, the fueling station is incompatible with the portable device for some reason etc.

From the user's point of view, the user simply connects portable device 108 to fueling stations 102 that the user encounters and pays a small additional amount to cover refueling charges as part of a regular bill for some other goods and services.

Prior to invoking method 190 the user and/or portable device 108 must be known to billing system 152. In some embodiments this is accomplished by:
- Forming a customer account on billing system 152. In many embodiments, the customer account is an account that relates to a pre-existing business relationship between the user and a service provider that relates to some service other than permitting access to fueling stations for portable devices. For example, the customer account may comprise an account for cellular telephone service or the like.
- After forming the customer account on billing system 152 providing portable device identification information for a portable device 108 to billing system 152. The portable device identification information may comprise a serial number or other unique information that can be retrieved from a portable device 108 and/or information generated at or for billing system 152.
- Linking the portable device identification information to the customer account. In some cases the portable device is automatically associated with a customer account (e.g. in the case of a cellular telephone or e-mail appliance).
- Placing a copy of the portable device identification information in identifier 154 of the portable device 108 (unless it is already there).

In some embodiments an authorization sequence is stored in the portable device 108. In such embodiments, the authorization sequence may be performed by the portable device or copied to a fueling station and performed by the fueling station to enable services to be provided by a fueling station to the portable device 108 of interest.

System 150 may be used in cases where a portable device 108 is associated with a pre-authorized refueling plan that does not require separate payments for each refueling transaction. For example, a user of portable device 108 may pay a monthly rate for access to network 150 or may be entitled to access network 150 as an incident to having purchased a package of services such as a cellular telephone plan, an internet service provision agreement, a contract with a utility company or the like. In such embodiments, billing network 152 does not need to track payment amounts for each time a portable device 108 is refilled at a fueling station 102. Billing network 152 verify that the portable device 108 is authorized to access system 150 and, if so, can authorize fueling station 102 to refill the portable device 108 with fuel.

In the example embodiments of FIG. 4, each portable device 108 has its own identifier 154 and information from that identifier 154 is automatically exchanged with a billing system 152. In some embodiments a fuel-cell powered portable device may be associated with a particular billing account by way of direct user interaction. For example, a user may provide identification information by:
  swiping a credit card or other identification through a reader associated with a fueling station 102 (see FIG. 7);
  entering a password at a user interface associated with a fueling station 102 or the like.
In such embodiments, a billing system can authorize the fueling station to operate to refill a portable device 108 to which it is connected if the information provided by the user indicates that the user is authorized to use the system.

Figure 6:
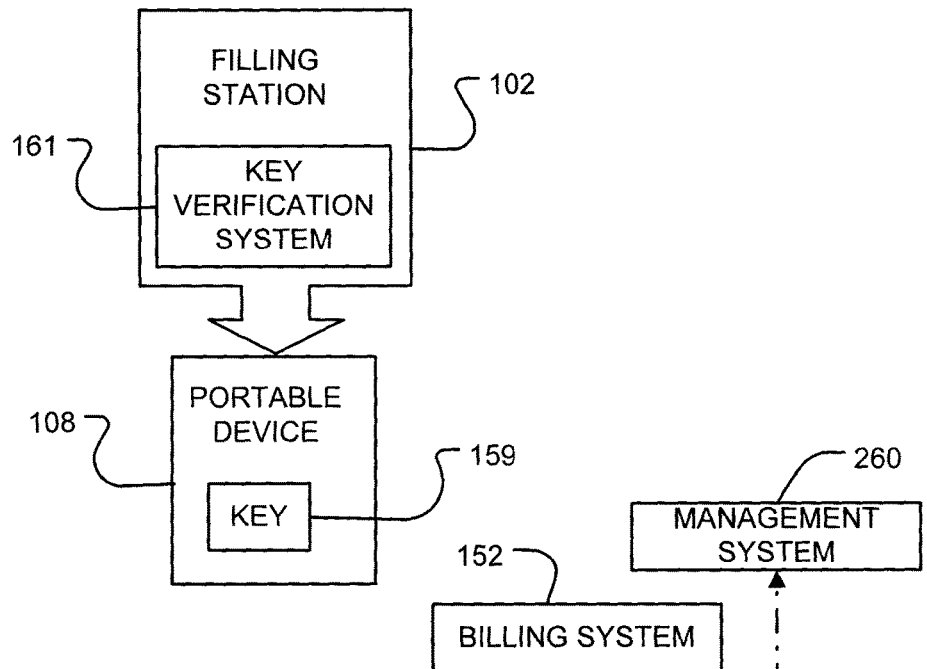
FIG. 6 is a schematic view of a system according to another embodiment of the invention wherein refueling is made available to pre-authorized portable devices.

In cases where a portable device 108 has been pre-authorized to receive fuel from network 150 on a flat-rate basis, the portable device 108 may carry internally a key 159. In such embodiments it is only necessary for portable device 108 to communicate with billing system 152 during the initial acquisition of key 159. Subsequently, during each refueling transaction it is only necessary for the portable device 108 to provide the key 159 to the fueling station 102 to which it is connected and for fueling station 102 to verify that the key is still valid. Fueling station 102 may have a key verification system 161 for this purpose. If key verification system 161 determines that the key is valid then fueling station 102 can operate to transfer fuel to the portable device 108. Otherwise fueling station 102 will not operate. A key 159 may comprise encrypted information that includes an expiry date, for example. An example embodiment in which a key 159 is carried internally in a portable device 108 is shown in FIG. 6.

A fueling station 102 for use in any of the systems described herein may have any suitable construction and may dispense any suitable fuels. Some examples of fuels that may be distributed by such a system include hydrogen, methanol, formic acid, butane, borohydride compounds and the like. Similarly, the mechanisms by which portable devices 108 consume fuel is not important to the invention. Portable devices 108 could use the fuel to generate electricity in fuel cells of types now known or types to be discovered in the future. In some embodiments, portable devices could use fuel for energy in other ways.

Figure 7:
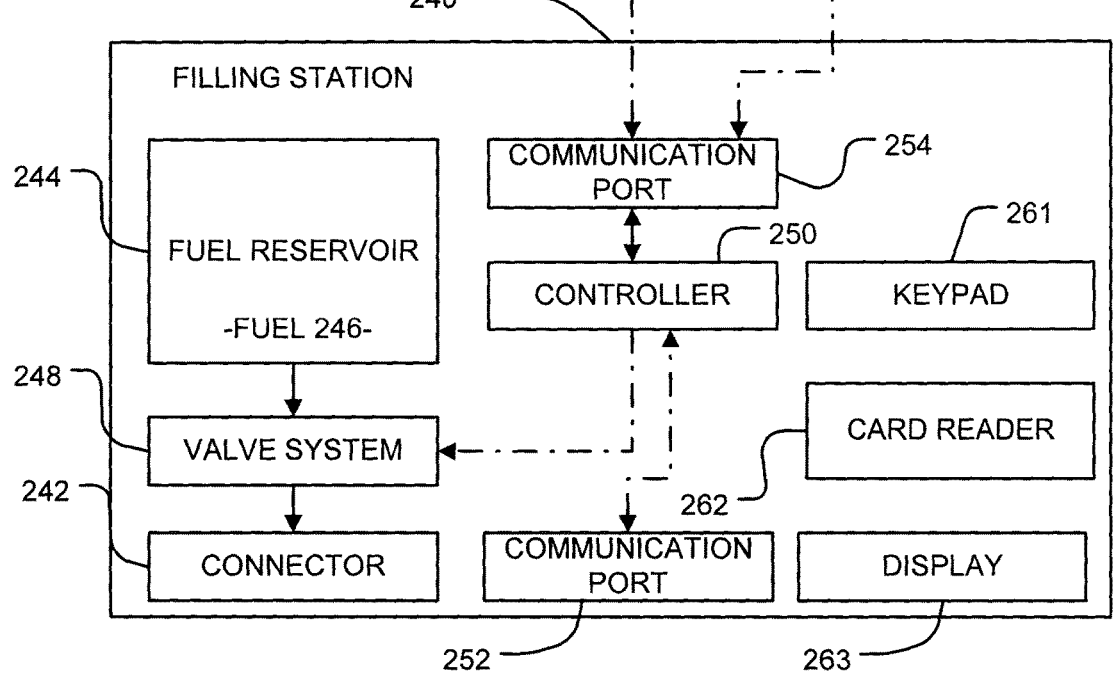
FIG. 7 is a schematic view of a fueling station of a type that could be used in refueling systems.

FIG. 7 shows a schematic view of a fueling station 240 of a type that could be used in systems for refilling portable devices with fuel. Fueling station 240 comprises a fuel connector 242 for connecting to a portable device 108 (a fueling station 240 could optionally have multiple different fuel connectors for delivering fuel to portable devices having different kinds of connector for receiving fuel), a fuel reservoir 244 containing fuel 246 to be dispensed, and a valve system 248 that optionally includes a fuel meter. A controller 250 controls valve system 248 to dispense fuel to a connected portable device 108. Controller 250 may comprise a programmed microprocessor, for example.

Instead of, or in addition to, internal fuel reservoir 244, fueling station 240 could be connected to an external supply of fuel. In some embodiments fueling station 240 comprises a fuel generator. For example, fueling station 240 could include a cell for generating hydrogen gas by the electrolysis of water.

Fueling station 240 also has a communication port 252 for exchanging information with a connected portable device 108 and, in some embodiments, a communication port 254 for exchanging communication with a remote system such as a billing system 152, or a management system 260 that monitors the status of fueling station 102 and arranges requests for maintenance of fueling station 102, when required. In the illustrated embodiment, fueling station 102 has a keypad 261 and card reader 262 for receiving information from a user as well as a display 263 for providing instructions to a user and for providing information regarding the status of any fuel transfers or other service operations being performed by the fueling station 240.

Fueling station 240 may optionally include features for verifying compatibility with specific portable devices 108 and/or other safety features. For example, fueling station 240 may comprise one or more of:
  A mechanism to ensure that only fuel of a correct type is delivered to a portable device.
  A mechanism for verifying that the fueling station 240 is compatible with a particular type of portable device.
  A mechanism for verifying that the portable device is in a condition in which it can receive refueling or some other service from the fueling station 240.
  A mechanism for verifying that the portable device is properly interconnected to the fueling station 240.
  A mechanism to limit the rate at which fuel is delivered to a portable device 108 to a rate that is safe for that portable device 108. The rate may be set based upon information retrieved by the fueling station from the portable device 108.
  A mechanism to inhibit refueling if the portable device (or its fuel) is at a temperature above a threshold or if environmental conditions make it unsafe to transfer fuel to the portable device.
  A mechanism for retrieving from a portable device 108 or from another data store accessible to the fueling station a fuel transfer sequence for a portable device 108. For example, such a sequence may specify cool down periods during or after fuel transfer, a variable rate for fuel transfer, a set pressure for fuel transfer, or the like.

Some portable fuel-cell-powered electronic devices may benefit from service operations in addition to refueling. Some examples of such service operations include:
  performing diagnostics on a fuel cell or other power system;
  reconditioning fuel cell catalysts;
  extracting spent fuel residues;
  cleaning fuel cell components;
  providing software upgrades; and
  the like;
A fueling station 102 may include facilities for performing one or more service operations in addition to replenishing a fuel supply of a portable device 108. A "service station" is a station that performs one or more service operations on a portable fuel-cell-powered electronic device. The one or more service operations may comprise fueling the device. A fueling station 102 is an example of a service station. A station that performs one or more other servicing operations and may or may not also provide fuel is also an example of a service station.

It is not mandatory that the cost for fueling a portable device 108 be the same for all fueling stations 102. In some markets consumers may be willing to pay increased prices for fueling portable devices 108. Examples of markets that may tolerate higher prices for fueling transactions include airports, train stations, and hotels, where users might be away from their normal charging infrastructure. The cost for a fueling transaction may depend in part on the location of the fueling station 102 or on capabilities of the fueling station 102. For example, the price for a fueling transaction may be higher for refueling transactions performed at a fueling station 102 capable of relatively rapidly fueling a portable device 108 than for fueling transactions performed at a fueling station 102 that requires more time to provide fuel.

In cases where regulations permit self-service refueling of portable devices 108, a system according to the invention may include some self-serve fuel vending machines in addition to fueling stations of the type described above. Such vending machines could accept direct payment for fuel. Such vending machines could be provided in locations where there is sufficient demand for fuel to outweigh the costs and inconvenience to the user associated with processing payment transactions for individual fueling transactions. Some example locations where such vending machines might be located are airports, train stations, bus stations, hotels and the like. Such vending machines can be similar in construction to fueling stations 102 or 240 with the addition of a payment acceptance mechanism. Examples of means of payment that could be accepted by a fuel vending machine include cash, prepaid tokens, prepaid electronic debit cards or other means of instantaneous payment. Such systems are common in the vending industry and are therefore not described herein. A vending machine could also operate either as a fueling station 102 for portable devices 108 associated with accounts on a billing system or the like and as a vending machine for portable devices 108 not associated with such accounts.

A fueling station may be combined with other automatic service-provision machines such as automatic teller machines (ATMs), vending machines selling food, drink or other commodities, other networks of stationary kiosk-type service devices, or the like. For example, bank machines are distributed in broad networks over many physical locations on multiple continents. A user engaged in a transaction with a bank machine is by definition in communication with a billing/financial transaction network. A fuel cell fueling station could readily be added as a peripheral device to the bank machine. Association of a fueling station with the banking machine or other network kiosk extends user convenience by allowing refueling to be completed during other regular transactions. Billing and/or authorization for refueling the portable device may be combined with and/or use facilities (such as communication links, billing systems etc.) provided primarily for the normal transaction being completed.

It can be seen that the embodiments described herein permit charges for fueling portable devices to be paid for together with other goods and services and/or paid for in a lump sum. This avoids the problem that the overhead associated with processing payments individually for very small amounts of fuel could add costs similar to or greater than the value of the fuel transferred. Further, the cost of refueling transactions can be determined by a previously-negotiated rule. Users will not have to think twice about refueling portable devices. Also, rules governing the fuel cell-fueling station transaction (e.g. rules relating to whether a particular portable device is entitled to receive fuel from a particular fueling station 102) can be piggybacked onto rules governing the provision of other services relating to the portable device (such as cellular telephone services, wireless internet access services or the like) or other services relating to the fueling station (such as retail services being provided at the location of the fueling station).

A system as described herein can facilitate various types of business transactions that can benefit consumers and businesses alike. For example, users of fuel-cell-powered cellular telephones may purchase a 'fueling contract' when they buy a cellular telephone (or later). In this case, a cellular telephone user is relieved from needing to discretely negotiate and pay for every refueling or service transaction. Instead, the user pays once for an overall contract for provision of telephone service and fuel replenishment services. As with billing for different cellular telephone services, it is possible to create different and preferential plans for charging for fueling.

For example, a service provider might provide the following refueling plans:
  an 'unlimited refueling' plan permitting a portable device 108 to be refueled at any fueling station 102 that is within a given geographical area at any time;
  a 'refueling on weekends and evenings' plan which only includes fueling on weekends and evenings (but may optionally permit fueling at other times on a 'per transaction' basis that may involve payment of a premium charge);
  a 'roaming refueling' plan that permits refueling at fueling stations 102 located in geographical areas remote from a home area.

A refueling plan may include other options that involve prepaying for refueling as an up front cost. Alternatively, a user could purchase a fixed amount of fuel with an additional cost associated with fuel usage beyond this initially-budgeted amount. Note that in the unlimited fueling options, simpler technology can be provided in fueling stations 102. Where the user cost does not depend upon an amount of fuel transferred, it is not necessary for billing purposes to meter accurately, or at all, the amount of fuel being provided to individual portable devices. Different plans could cause refueling to occur at different rates. For example, devices of users who subscribe to a premium plan may be refueled at a high rate whereas devices of users who subscribe to a low-cost plan may be refueled at a slower rate.

Providers of mobile services, such as cellular telephones, can extend their business to include the provision of fuel and related services. Therefore it becomes possible for current providers of information services to extend the business into the provision of portable energy.

Some embodiments of the invention comprise billing systems that provide 'two-tiered' or 'multi-tiered' pricing schemes. In such embodiments, the cost for a fueling transaction may depend, at least in part, upon whether or not a user has a pre-arranged fueling plan and optionally on the type of plan. The price charged for each fueling transaction may be less for users who have pre-arranged fueling plans (or loyalty plans or similar plans) than for users who do not have such pre-arranged plans. Users without such plans may be charged 'one-time-user' fees for refueling transactions. The one-time-user fees could be significantly higher than fees paid by users who are members of fueling plans.

A system of fueling stations, as described herein, in combination with one of the business structures described herein can result in radical changes in consumer behaviour and surprisingly significant improvements in the convenience with which consumers can use portable electronic devices of a wide variety of types. Such systems can support rapid refueling and 'top up' refueling. Prior technologies require users to purchase expensive batteries or to charge storage batteries. These technologies strive to maximize the time until it becomes necessary to endure the inconvenience of charging or replacing batteries.

Systems according to this invention facilitate frequent topping up of fuel supplies with virtually no inconvenience to users, since the topping up can be performed concurrently with some other transaction that the user will perform anyway. Refueling a portable device 108 can typically be completed in less than the time it takes to complete most regular transactions that users might become involved in.

A consumer who is in the habit of topping up a cellular telephone: while buying a cup of coffee, buying groceries, dealing with a bank teller, visiting a hardware store, paying for a meal at a restaurant, paying for a purchase of fuel for a car, etc. can enjoy continuous use of their cellular telephone and other portable devices without having to worry about running out of power. As long as the user does business of some kind at a location that has a fueling station 102 at least as frequently as a full charge of fuel lasts, the user's cellular telephone and/or other portable devices will never need separate attention as it will always be fueled.

It can be seen that the embodiments described above permit a method for operating a portable fuel-consuming device. The method involves:

During a period of several hours or a day or more (e.g. a period of a few hours, to about 18 hours or to about 48 hours, or to a week or more) carrying the portable device while the device is in an operational state in which it consumes fuel from an internal fuel reservoir and using the portable device.

During the period, transacting commercial transactions at each, or any, of several different businesses. Each of the businesses having a fueling station capable of providing fuel to the portable device. The businesses include businesses of several different types.

Substantially concurrently with transacting each of the commercial transactions, connecting the portable device to a fueling station of the business with which the transaction is being made and transferring some fuel into the fuel reservoir of the portable device. This step may be commenced while the fuel in the fuel reservoir of the portable device is partially filled (or nearly empty or completely empty). By commencing this step before the reservoir is nearly empty or completely empty the portable device may be kept continuously operational.

Paying for refueling the portable device either in the same payment transactions as payments for the commercial transactions or in the same payment transaction or transactions for some other service that the user of the portable device has contracted to receive. In some embodiments the amounts of payments for refueling the portable device are very much smaller than the total amount of the payment transaction in which it is included.

The businesses may include any businesses at which users may visit to conduct transactions. For example, the businesses may include:
coffee shops;
restaurants;
newsstands;
banks;
bars;
pubs;
grocery stores;
convenience stores;
automobile service stations;
repair shops;
telephone showrooms;
hardware stores;
book stores;
bakeries;
clothing stores;
department stores;
stores selling parts for automobiles or other products;
etc.

The technology described herein removes a time barrier associated with refueling or recharging that has precluded this type of transaction in the past. A second barrier to this fast refueling being deployed is the inordinate bother and cost associated with negotiating the financial aspect of the refueling transaction, since the actual cost of these top up fuelings will be very low.

It can be appreciated from the foregoing that the ability to 'top up' (e.g. partially refill) a system at low cost and with minimal effort can provide very significant benefits in comparison to a model in which a user replaces fuel cartridges when the cartridges are empty. A user can refill a portable device any time that the user is at a fueling station. After refueling, the user knows that the device will continue to run for its full run-time. A cartridge replacement model of operation requires the user to travel with a spare cartridge at all times and be ready to switch when needed, or to make a decision to waste the remaining contents of a partially-spent cartridge in order to guarantee operation for a specified time period. A home-based refueling model is also unsatisfactory, requiring that the duration of operation be always shorter than the time it will take to get back home again.

Both the provider of the service, whether the provider is a retailer, a cellular telephone provider or a separate legal entity that manages a network of fueling stations 102 and the consumer benefit. This business model facilitates the deployment of refueling infrastructure since retailers and other businesses will wish to provide fueling stations for the purpose of attracting customers.

The operator of a network of fueling stations 102 can benefit in at least the following ways:
Opportunity to distribute fuel on a large scale;
Opportunity to move a business into refueling, with long term growth in non-petroleum fuels;
Opportunity to earn revenue through a high volume of individually small transactions;
Opportunity to earn revenue through sales of service contracts;
Opportunity to attract users of fuel-consuming portable devices to other business operations;
Opportunity to replace the consumption of primary batteries and electrical power that may be generated from fossil fuels with the consumption of hydrogen or other clean fuels;
Opportunity to develop the fuel cell industry by making fuel for fuel-cell powered devices conveniently and affordably available to consumers; and,
Opportunity to provide an incentive to customers by providing free refueling as a loss-leader or consumer premium.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:
1. A system comprising:
a source of fuel;
a connector for connecting to a fuel-cell-powered portable device;

a valve system connected to control dispensation of a liquid or gas fuel from the fuel source to a reservoir in a fuel-cell-powered portable device connected to the connector;

a controller operative to control the valve system to dispense the liquid or gas fuel to the reservoir in the fuel-cell-powered portable device;

a receiver configured to detect a type of the fuel cell powered portable device based upon information retrieved by the fuelling station from the portable device; and a variable rate controlling mechanism to limit the rate at which the liquid or gas fuel flows into the fuel cell powered device to refuel the fuel cell powered device, wherein the variable rate controlling mechanism is configured to choose the rate limit based on a rate that is safe for the type of the fuel cell powered portable device detected; and, wherein the rate-limiting mechanism is configured to set the rate based upon one or more of a user-subscription plan; a threshold temperature of a portable device; a threshold temperature of fuel in a portable device; a pressure in an internal reservoir of a portable device; and a pressure of fuel in a portable device.

2. The system of to claim 1, wherein the source of fuel comprises a source for one or more of hydrogen; methanol; formic acid; butane; and borohydride compounds.

3. The system of claim 1, wherein the source of fuel comprises sources of a plurality of different fuels.

4. The system of claim 1, further comprising multiple different fuel connectors for delivering fuel to portable devices having different kinds of connectors for receiving fuel.

5. The system of claim 1, further comprising a mechanism for inhibiting refueling of a connected portable device based upon one or more of: if the portable device is at a temperature above a threshold temperature; if a pressure in an internal reservoir of a portable device is not at a correct pressure; and if a pressure of fuel in a portable device is not at a correct pressure.

6. The system of claim 1, further comprising a mechanism for retrieving from a data store accessible to the fueling station a fuel transfer sequence for a connected portable device.

7. The system of claim 6, wherein the mechanism for retrieving the fuel transfer sequence is configured to set one or more of:

one or more cool down periods during or after fuel transfer, a variable rate for fuel transfer, and a set pressure for fuel transfer, according to the fuel transfer sequence retrieved from the data store.

8. The system of claim 1, further comprising a service mechanism configured to perform one or more service operations on a connected portable device, the service operations comprising one or more of:

performing diagnostics on a fuel cell or other power system;

reconditioning a fuel cell catalyst;

extracting spent fuel residues;

cleaning fuel cell components; and providing a software upgrade.

9. The system of claim 1, further comprising a mechanism for ensuring that only fuel of a correct type is delivered to a connected portable device.

10. The system of claim 1, further including a point-of-sale terminal, wherein the fueling station and point-of-sale terminal are connected by an interface and the point-of-sale terminal is configured to combine a first payment amount related to fueling a portable device with a second payment amount related to a commercial transaction being processed by the point-of-sale terminal.

11. The system of claim 10, wherein the point-of-sale terminal comprises a user interface control that is configured to add a set amount for the first payment amount to the second payment amount.

12. The system of claim 10, wherein the point-of-sale terminal is programmed to charge a first price for fueling a portable device in a stand alone transaction and a reduced price for fueling the portable device as part of a combined transaction.

13. The system of claim 10, wherein the point-of-sale terminal is configured to not combine the first payment amount with the second payment amount if the second payment amount exceeds a threshold value.

14. The system of claim 1, wherein the fuel source comprises a fuel generator.

15. The system of claim 14, wherein the fuel generator comprises a hydrogen gas generator.

16. The system of claim 1, further including a banking machine or other network kiosk.

17. The system of claim 1, further including a key verification system for determining whether a pre-approval key communicated by a connected portable device is valid.

18. The system of claim 1, further including a reader for reading from a connected portable device an identifier comprising one or more of a procedure for transferring fuel to the portable device; a reference to a source of external information relating to the portable device; and information identifying fuel requirements for the portable device.

19. A fueling station for fuel-cell-powered portable devices, the fueling station comprising:

a source of a liquid or gas fuel;

a means for connecting a fuel-cell-powered portable device to the fueling station;

a means for controlling dispensation of the liquid or gas fuel from the fuel source to a reservoir within the fuel-cell-powered portable device;

a means for detecting a type of the fuel cell powered portable device based upon information retrieved by the fueling station from the portable device; and a means for varying a limit of the rate at which the liquid or gas fuel flows into the fuel cell powered portable device to refuel the fuel cell powered portable device, wherein a selected limit is based on a rate that is safe for the type of fuel cell powered portable device detected; and, wherein the rate-limiting mechanism is configured to set the rate based upon one or more of a user-subscription plan; a threshold temperature of a portable device; a threshold temperature of fuel in a portable device; a pressure in an internal reservoir of a portable device; and a pressure of fuel in a portable device.

20. The fueling station for fuel-cell-powered portable devices of claim 19, wherein the means for controlling dispensation of the liquid or gas fuel from the fuel source further includes a mechanism to ensure that only fuel of a correct type is delivered to the fuel-cell-powered portable device.

21. The fueling station for fuel-cell-powered portable devices of claim 20, wherein the means for controlling dispensation of the liquid or gas fuel from the fuel source further includes a mechanism to ensure that the fuel-cell-powered portable device is in condition in which it can receive fuel.

22. The fueling station for fuel-cell-powered portable devices of claim 21, wherein the means for controlling dispensation of the liquid or gas fuel from the fuel source further includes a mechanism to inhibit transfer of the liquid or gas fuel if the fuel-cell-powered portable device is at a temperature above a threshold temperature.

23. The fueling station for fuel-cell-powered portable devices of claim 22, wherein the means for controlling dispensation of the liquid or gas fuel from the fuel source further includes a mechanism to specify a cool down period during or after fuel transfer.

* * * * *